US009282263B2

(12) United States Patent
Totsuka

(10) Patent No.: US 9,282,263 B2
(45) Date of Patent: Mar. 8, 2016

(54) SOLID-STATE IMAGING APPARATUS WITH DRIVING LINES SUPPLYING DRIVING SIGNALS THROUGH BUFFERS ARRANGED BETWEEN PIXELS

(71) Applicant: CANON KABUSHIKI KAISHA, Tokyo (JP)

(72) Inventor: Hirofumi Totsuka, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 14/094,325

(22) Filed: Dec. 2, 2013

(65) Prior Publication Data

US 2014/0168491 A1 Jun. 19, 2014

(30) Foreign Application Priority Data

Dec. 14, 2012 (JP) ................................. 2012-273541

(51) Int. Cl.
*H04N 5/335* (2011.01)
*H04N 5/365* (2011.01)
*H04N 5/376* (2011.01)

(52) U.S. Cl.
CPC ............. *H04N 5/3658* (2013.01); *H04N 5/376* (2013.01)

(58) Field of Classification Search
CPC .............................. H04N 5/376; H04N 5/3658
See application file for complete search history.

(56) References Cited

U.S. PATENT DOCUMENTS

| 7,633,540 | B2 | 12/2009 | Totsuka |
| 7,990,440 | B2 | 8/2011 | Kobayashi et al. |
| 8,084,729 | B2 | 12/2011 | Kato et al. |
| 8,154,639 | B2 | 4/2012 | Kato et al. |
| 8,189,081 | B2 | 5/2012 | Totsuka |
| 8,310,574 | B2 * | 11/2012 | Okano et al. .................. 348/294 |
| 8,411,185 | B2 | 4/2013 | Totsuka |
| 8,553,118 | B2 | 10/2013 | Saito et al. |
| 8,605,182 | B2 | 12/2013 | Totsuka et al. |
| 2011/0080625 | A1 | 4/2011 | Totsuka |
| 2012/0008030 | A1 | 1/2012 | Kono et al. .................. 348/301 |
| 2014/0009651 | A1 | 1/2014 | Totsuka et al. |

OTHER PUBLICATIONS

H. Takahashi, et al., "A 300mm Wafer-Size CMOS Image Sensor for Low-Light-Level Imaging," International Image Sensor Workshop, Jun. 2011.

* cited by examiner

*Primary Examiner* — Gary C Vieaux
(74) *Attorney, Agent, or Firm* — Fitzpatrick, Cella, Harper & Scinto

(57) ABSTRACT

An object is to provide a solid-state imaging apparatus capable of causing driving signals of pixels to reach the entire screen and of driving all the pixels. The solid-state imaging apparatus includes a pixel region including a plurality of pixels therein, each pixel having a photoelectric conversion element and at least one transistor, and a plurality of driving lines, each driving each of the plurality of transistors arranged in the pixel region, wherein the driving line supplies a driving signal through a buffer arranged in the pixel region to the transistor, and the number of the buffers is smaller than the number of the pixels.

20 Claims, 6 Drawing Sheets

SOLID-STATE IMAGING APPARATUS WITH DRIVING LINES SUPPLYING DRIVING SIGNALS THROUGH BUFFERS ARRANGED BETWEEN PIXELS

BACKGROUND OF THE INVENTION

1. Field of the Invention

The present invention relates to a solid-state imaging apparatus.

2. Description of the Related Art

CMOS sensors have long been used for digital cameras and video cameras, and in recent years, expectations for CMOS sensors in the field of medical care or astronomy where a large-area solid-state imaging apparatus is required have been rising. For example, a technique of performing astronomical observation by attaching a sensor chip of about 200 mm square to an astronomical telescope is reported in H. Takahashi, et al., "A 300 mm Wafer-Size CMOS Image Sensor for Low-Light-Level Imaging," International Image Sensor Workshop, June 2011 (hereinafter Non-Patent Document 1).

SUMMARY OF THE INVENTION

For example, a case of a full size CMOS sensor which is mounted on a single-lens reflex camera is considered. Pixels to be driven by a vertical scanning circuit on a per-row basis are arranged over the length of about 36 mm, and thus, the vertical scanning circuit drives the gate capacitances of several thousands of pixels in one row and the parasitic component of a signal wire of the length.

However, in the case of a large area sensor that exceeds the order of 100 mm as in Non-Patent Document 1 mentioned above, it is difficult to drive the pixels in one row only by the driving power of the vertical scanning circuit. In the example of Non-Patent Document 1, this problem is overcome by dividing the pixel region of 200 mm into ten, and driving each of the separated regions by a separate vertical scanning circuit. In this example, since the pixel pitch is extremely wide, being 160 μm square, the vertical scanning circuits may be arranged in the pixel region without disturbing the pixel pitch. However, application is difficult in the case of reduced pixel pitch because the circuit does not fit into the pixel pitch and region of the vertical scanning circuits will be a non-sensitive area over a plurality of columns.

An object of the present invention is to provide a solid-state imaging apparatus capable of causing driving signals of pixels to reach the entire screen, and of driving all the pixels.

According to an aspect of the present invention, a solid-state imaging apparatus comprises: a pixel region including a plurality of pixels arranged therein, each pixel having a photoelectric conversion element and at least one transistor; a plurality of driving lines, each driving each of the plurality of transistors arranged in the pixel region; and a scanning circuit arranged at an outside of the pixel region, the scanning circuit being configured to supply a driving signal to each of the plurality of driving lines, wherein the driving line supplies the driving signal through a buffer arranged in the pixel region to the transistor, a number of the buffers is smaller than a number of the pixels.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
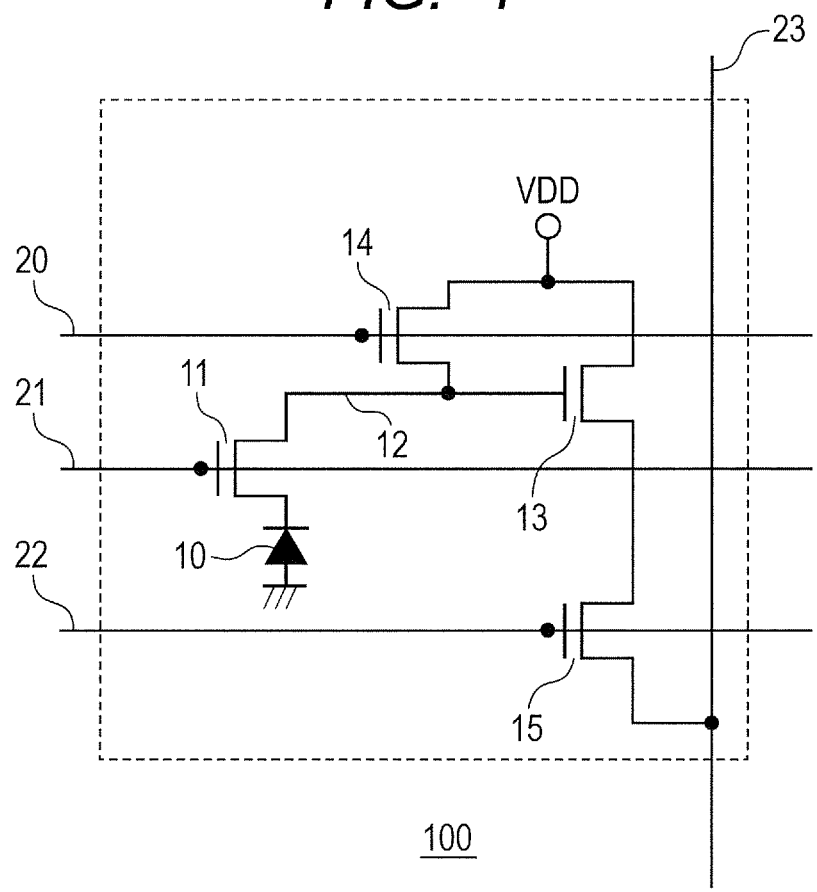
FIG. 1 is a configuration diagram of a pixel.

FIG. 1 is a configuration diagram illustrating an example of a pixel 100 according to a first embodiment of the present invention. The pixel 100 includes a photoelectric conversion element 10, a transfer transistor 11, a read out node 12, a source follower transistor 13, a reset transistor 14 and a selecting transistor 15. A reset driving line 20 supplies a reset driving signal to the gate of the reset transistor 14. A transfer driving line 21 supplies a transfer driving signal to the gate of the transfer transistor 11. A selecting driving line 22 supplies a selecting driving signal to the gate of the selecting transistor 15. The plurality of driving lines 20 to 22 each drive the plurality of transistors 14, 11 and 15 of the pixel 100. In FIG. 1, an example configuration of the pixel 100 including the transfer transistor 11 is described, but the configuration of the pixel 100 may be such that the photoelectric conversion element 10 and the source follower transistor 13 are directly connected. The pixel 100 includes the photoelectric conversion element 10 and at least one transistor.

The photoelectric conversion element 10 is a photo diode, for example, and converts light into charge by photoelectric conversion and accumulates the charge. The transfer transistor 11 is turned on when the level of the transfer driving line 21 becomes high, and transfers the charge accumulated in the photoelectric conversion element 10 to the read out node 12. The source follower transistor 13 amplifies the voltage of the read out node 12, and outputs the same from the source. The selecting transistor 15 is turned on when the level of the selecting driving line 22 becomes high, and outputs a pixel signal of the source of the source follower transistor 13 to a vertical output line 23. The reset transistor 14 is turned on when the level of the reset driving line 20 becomes high, and resets the potential of the read out node 12 and/or the photoelectric conversion element 10 to a power supply potential VDD.

Figure 2:
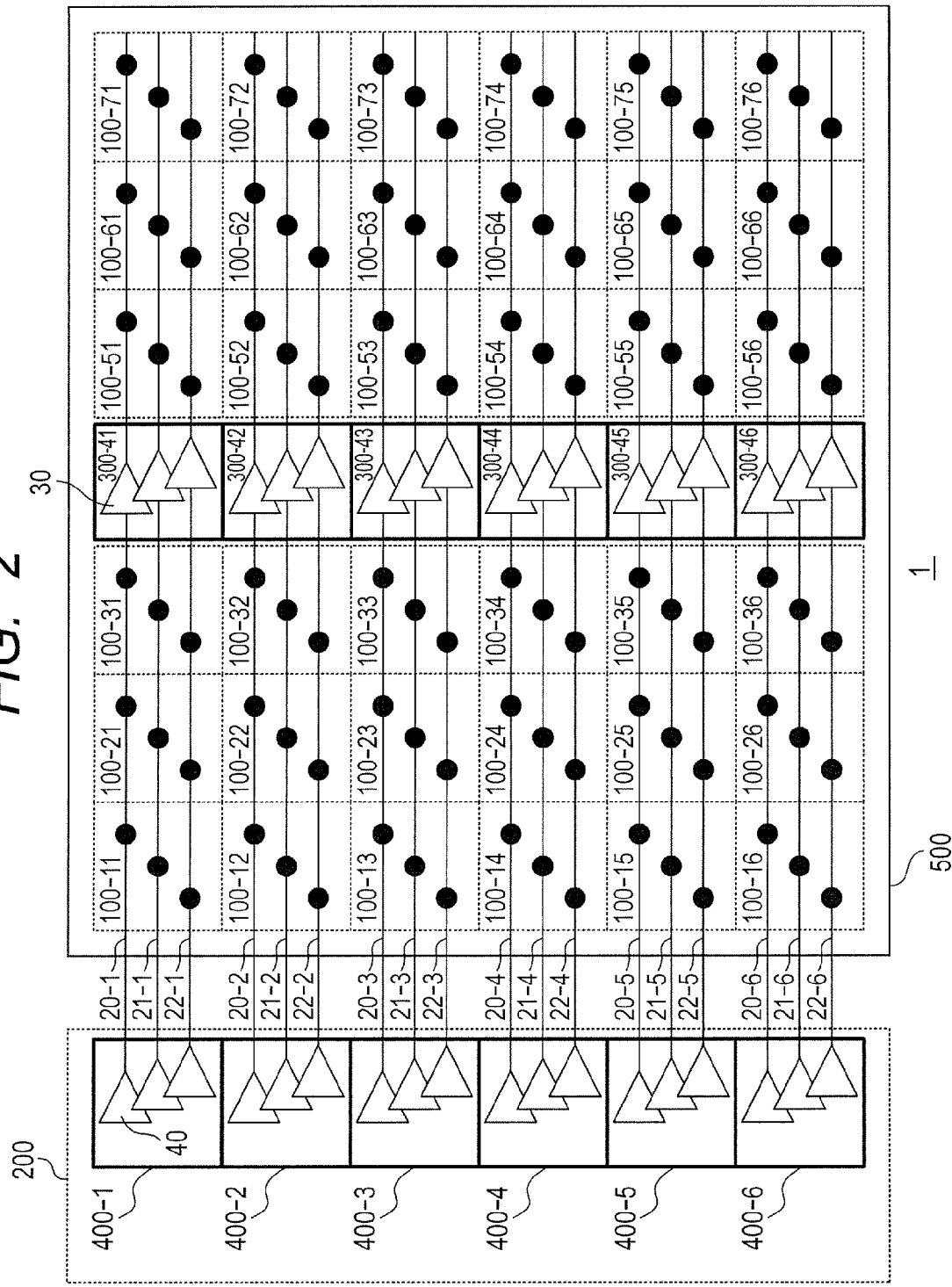
FIG. 2 is a configuration diagram of a solid-state imaging apparatus according to a first embodiment of the present invention.

FIG. 2 is a diagram illustrating an example configuration of a solid-state imaging apparatus 1 according to the first embodiment of the present invention. In the following, where a hyphen and two numbers are described, such as "pixel 100-11", the numbers following the hyphen are to indicate the addresses of a column and a row. That is, in the case of a pixel 100-12, the pixel 100 (FIG. 1) at column 1, row 2 is indicated. Also, where a hyphen and one number are described, the number following the hyphen is to indicate the address of a row or a column. That is, in the case of a reset driving line 20-2, the reset driving line 20 (FIG. 1) at row 2 is indicated. Additionally, in the case of column 10 or greater or row 10 or greater, a hexadecimal number is used.

In FIG. 2, there are 6 rows and 6 columns of pixels 100-11 to 100-76, and one column of buffer arranging regions 300-41 to 300-46, but the numbers of pixels and buffer arranging regions are not limited to such. A vertical scanning circuit is denoted by reference numeral 200, a buffer arranging region is denoted by reference numeral 300, an output circuit section of the vertical scanning circuit 200 is denoted by reference numeral 400, and a pixel region where the pixels 100 are arranged in a matrix is denoted by reference numeral 500. Buffers in the buffer arranging regions 300-41 to 300-46 are denoted by reference numerals 30, and an output circuit of the output circuit section 400 is denoted by reference numeral 40. The pixel 100 has the configuration illustrated in FIG. 1. In FIG. 2, the connection state of each pixel 100 and each of the driving lines 20 to 22 is indicated by a black circle. The vertical scanning circuit 200 outputs driving signals to the driving lines 20 to 22 in the pixel region 500. The buffer arranging region 300 is arranged in the pixel region 500. The buffer 30 is configured from two inverters, for example, and may be arranged in the pixel region 500 with a circuit scale smaller than that of the vertical scanning circuit 200. The output circuits 40 in each row drive the pixels 100 in the first to third columns via the driving lines 20 to 22. The buffers 30 in each row are provided in the fourth column between the pixel 100 in the third column and the pixel 100 in the fifth column, and relay the driving signals input from the output circuits 40 through the driving lines 20 to 22 and drive the pixels 100 in the fifth to seventh columns. The driving lines 20 to 22 supply the driving signals to the transistors 11, 14 and 15 in the pixel 100 through the buffers 30 in the buffer arranging region 300 arranged in the pixel region 500. The number of buffers 30 in the buffer arranging region 300 is three, for example, and is the same as the number of the transistors 11, 14 and 15 connected to the driving lines 20 to 22 in the pixel 100. The pixels 100 and the buffer arranging regions 300 are arranged in the pixel region 500 in a matrix. The buffers 30 are provided in the buffer arranging region 300, and one or more of the same are provided to each of the driving lines 20 to 22. The number of the buffers 30 is smaller than the number of the pixels 100, and the buffers are arranged in electric paths of the driving lines 20 to 22. The transistors 11, 14 and 15 of the pixels 100 in a matrix are transistors arranged at input nodes of the buffers 30 in the prior stage of the buffers, and are transistors arranged at output nodes of the buffers 30 in the following stage of the buffers 30.

In FIG. 2, the buffer arranging regions 300 are arranged one for each row and with an interval of 4-pixels, but a plurality of buffer arranging regions 300 may also be arranged. At this time, the driving power of the buffers and the pixel pitch are taken into account, and for example, in the case the pixel pitch is 10 μm, the interval of arrangement may be 30 mm (3000 pixels). Also, the buffers 30 for all the driving signals necessary for one row are arranged in the buffer arranging region 300. According to such an arrangement, even with a large area sensor, the driving signals of the driving lines 20 to 22 from the vertical scanning circuit 200 may reach all the pixels. Since a pixel signal is not output from the buffer arranging region 300 to the vertical output line 23 (FIG. 1), this may be treated at the time of image processing as a region where the pixel 100 is missing. In this case, the signal of the missing region may be played back by a correction process based on the pixel signals of the pixels 100 on the left and right of the buffer arranging region 300, for example.

In FIG. 2, the buffer arranging region 300 is approximately the same size as the pixel 100, but the buffer arranging region 300 may have a smaller area than the pixel 100. Alternatively, the buffer arranging region 300 may have a larger area than the pixel 100. In this case, the area of the photoelectric conversion element 10 of the pixel 100 adjacent to the buffer arranging region 300 may be smaller than the area of the photoelectric conversion element 10 of the pixel 100 not adjacent to the buffer arranging region 300.

Figure 3:
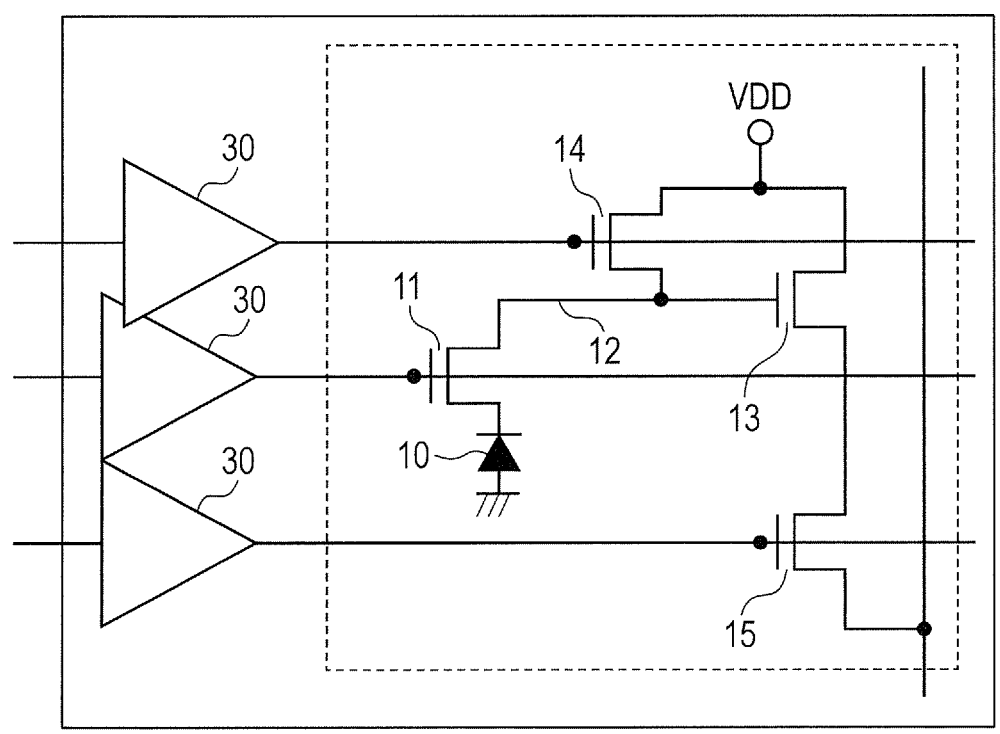
FIG. 3 is a configuration diagram of a buffer arranging region.

FIG. 3 illustrates a buffer arranging region 310 of an example configuration different from the buffer arranging region 300 in FIG. 2. The buffer arranging region 310 may include inside a configuration equivalent to that of the pixel 100. Here, although depending on the relationship with the pixel pitch, the area and shape of the photoelectric conversion element 10 in the buffer arranging region 310 may be smaller than those of the photoelectric conversion element 10 of the pixel 100 outside the buffer arranging region 310. Although the buffer arranging region 310 has a light detection sensitivity lower than the pixel 100, the play back accuracy of the signal of the buffer arranging region 310 in image processing may be improved if some signal level is output. The buffer arranging region 310 includes the photoelectric conversion element 10 having an area smaller than that of the photoelectric conversion element 10 of the pixel 100. The area of the buffer arranging region 300 may thereby be made smaller than the area of the pixel 100.

Also, in the case where the pixel pitch is great, being 100 μm or more, for example, and not much opening is necessary for the pixel 100, the area of the photoelectric conversion element 10 in the buffer arranging region 310 and the area of the photoelectric conversion element 10 of the pixel 100 may be made uniform. That is, the buffer arranging region 310 includes the photoelectric conversion element 10 having the same area as the photoelectric conversion element 10 of the pixel 100. At this time, a transistor element having the same size as the buffer 30 in the buffer arranging region 310 and not connected to a terminal may be arranged in the pixel 100 as a dummy transistor. That is, the pixel 100 includes a dummy-buffer having the same size as the buffer 30 in the buffer arranging region 310. Also, the buffer arranging region 310 may be arranged at the same position as the buffer arranging region 300 of the solid-state imaging apparatus in FIG. 2.

As illustrated in FIG. 2, the output circuit 40 of the vertical scanning circuit 200 and the buffer 30 in the buffer arranging region 300 are equivalent circuits. That is, the buffer 30 has the same driving power as that of the output circuit 40. Accordingly, the driving power of the circuits may be made uniform, and the pitch of the buffer arranging regions 300 starting from the vertical scanning circuit 200 may be made the same. Also, the output circuit 40 and the circuit of the buffer 30 may be different circuits. That is, the buffer 30 has a different driving power from that of the output circuit 40. Accordingly, an optimal driving power according to the arranging interval of each circuit may be provided.

As described above, the buffer arranging region 300 or 310 including the buffer 30 is arranged in the pixel region 500. Accordingly, the driving signals of the driving lines 20 to 22 output from the vertical scanning circuit 200 may reach the entire screen of the large area sensor, and all the pixels 100 may be driven.

Second Embodiment

Figure 4:
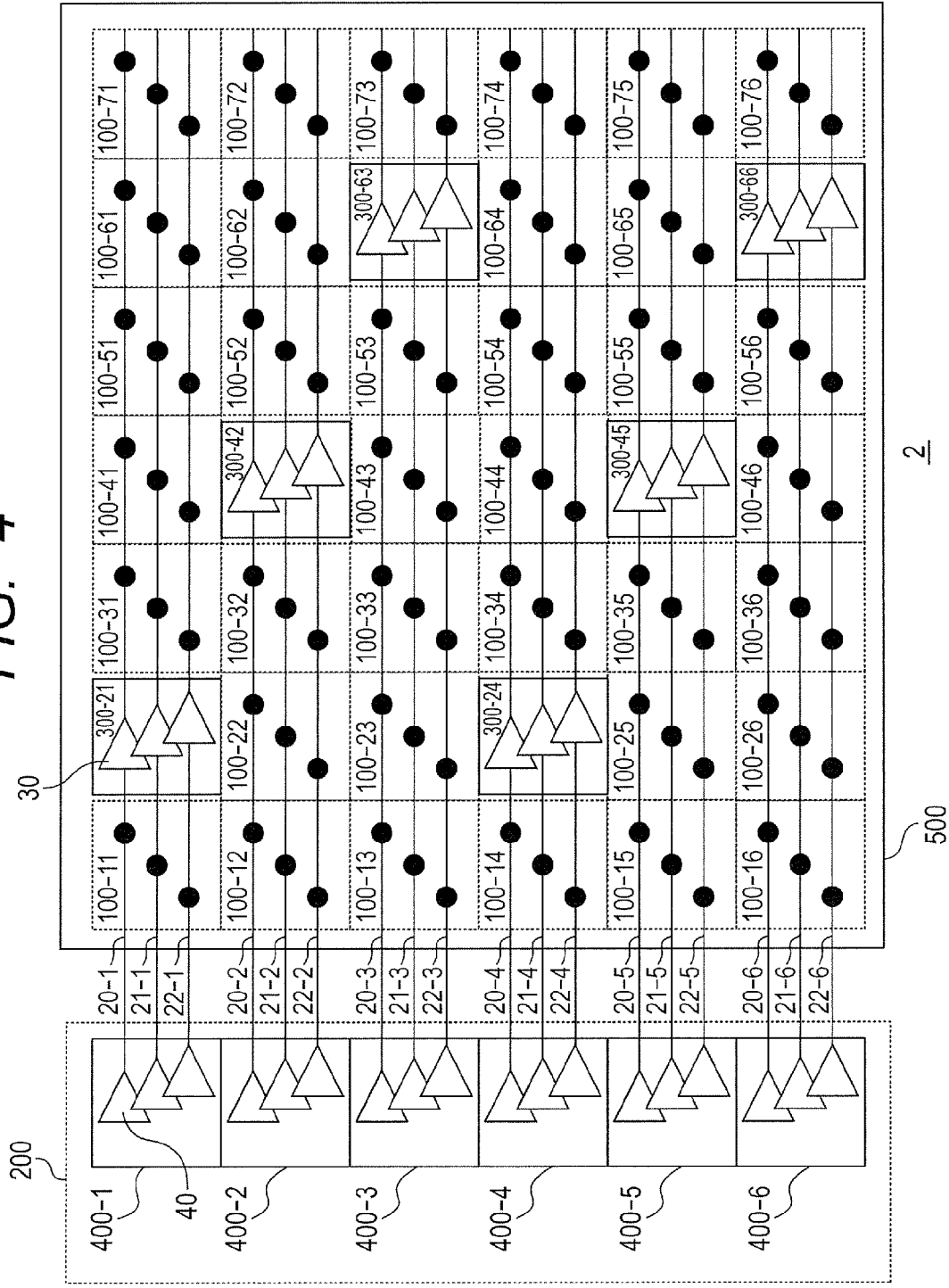
FIG. 4 is a configuration diagram of a solid-state imaging apparatus according to a second embodiment of the present invention.

FIG. 4 is a diagram illustrating an example configuration of a solid-state imaging apparatus 2 according to a second embodiment of the present invention. According to the present embodiment, the buffer arranging regions 300 in adjacent rows are arranged in different columns. For example, in the first row, the buffer arranging region 300-21 is arranged in the second column, in the second row, the buffer arranging region 300-42 is arranged in the fourth column, and in the third row, the buffer arranging region 300-63 is arranged in the sixth column. The buffer arranging regions 300-21 and 300-42 arranged in adjacent rows are arranged in different columns. With the buffer arranging regions 300 in adjacent rows being arranged in different columns, the pixels 100 are present in four directions, top, down, left and right, of the buffer arranging region 300. Thus, the driving signals of the driving lines 20 to 22 may reach all the pixels 100 in the large area sensor, and also, the play back accuracy of the pixel signal of the buffer arranging region 300 in image processing may be improved compared to the first embodiment.

Also, in FIG. 4, the buffer arranging regions 300 in the adjacent rows are arranged, being separated by more than one column. According to such an arrangement, the pixels 100 are present in eight adjacent directions of the buffer arranging region 300 including top, down, left, right and oblique directions, and the play back accuracy of the pixel signal of the buffer arranging region 300 in image processing may be further improved.

Also in the present embodiment, as in the first embodiment, one buffer arranging region 300 is arranged in each row, but a plurality of buffer arranging regions 300 may also be arranged. At this time, the driving power of the buffer 30 and the pixel pitch are taken into account, and for example, in the case the pixel pitch is 10 μm, the interval of arrangement may be 30 mm (3000 pixels).

Also in FIG. 4, as in FIG. 2, the buffer arranging region 300 has about the same size as the pixel 100, but the buffer arranging region 300 may also have a smaller area than the pixel 100. Or, the buffer arranging region 300 may have a larger area than the pixel 100. In this case, the area of the photoelectric conversion element 10 of the pixel 100 adjacent to the buffer arranging region 300 may be smaller than the area of the photoelectric conversion element 10 of the pixel 100 not adjacent to the buffer arranging region 300.

Also, the buffer arranging region 310 (FIG. 3) may be arranged instead of the buffer arranging region 300. Furthermore, in the case where the pixel pitch is great, being 100 μm or more, for example, and not much opening is necessary for the normal pixel 100, the area of the photoelectric conversion element 10 in the buffer arranging region 310 and the area of the photoelectric conversion element 10 of the pixel 100 may be made uniform. At this time, the same number of transistor elements as the buffer arranging regions 310 may be arranged in the pixel 100, the transistor elements having the same size as the buffer 30 in the buffer arranging region 310 and not connected to terminals.

In FIG. 4, the output circuit 40 of the vertical scanning circuit 200 and the buffer 30 in the buffer arranging region 300 are made equivalent circuits, to thereby make the driving power of the circuits uniform, and to make the pitch of the buffer arranging regions 300 starting from the vertical scanning circuit 200 the same. Or, by making the output circuit 40 and the circuit of the buffer 30 different, an optimal driving power according to the arranging interval of each circuit may be provided.

In FIG. 4, the buffer arranging region 300 is arranged in the same column every third row, but the buffer arranging region 300 may be arranged in the same column every second row or every fourth row or more. The buffer arranging regions 300 are separated as much as possible, and in the case there is regularity (in FIG. 4, "every third row"), the interval of the regularity is desirably increased as much as possible, and most desirably, there is no regularity. This is because, by reducing the spatial frequency of the arranging interval of the buffer arranging regions 300 as much as possible, the influence of a pixel signal missing due to the buffer arranging region 300 at the time of viewing of the captured image may be reduced as much as possible.

A described above, at the time of arranging the buffer arranging regions 300 or 310 including the buffer 30 in the pixel region 500, the buffer arranging regions 300 or 310 in the adjacent rows are arranged in different columns, and moreover, the buffer arranging regions 300 or 310 are arranged with more than one column in-between. Accordingly, the driving signals of the driving lines 20 to 22 output from the vertical scanning circuit 200 may reach the entire screen of the large area sensor, and all the pixels 100 may be driven. Furthermore, the play back accuracy of a pixel signal missing due to the buffer arranging region 300 or 310 may be improved.

Third Embodiment

Figure 5:
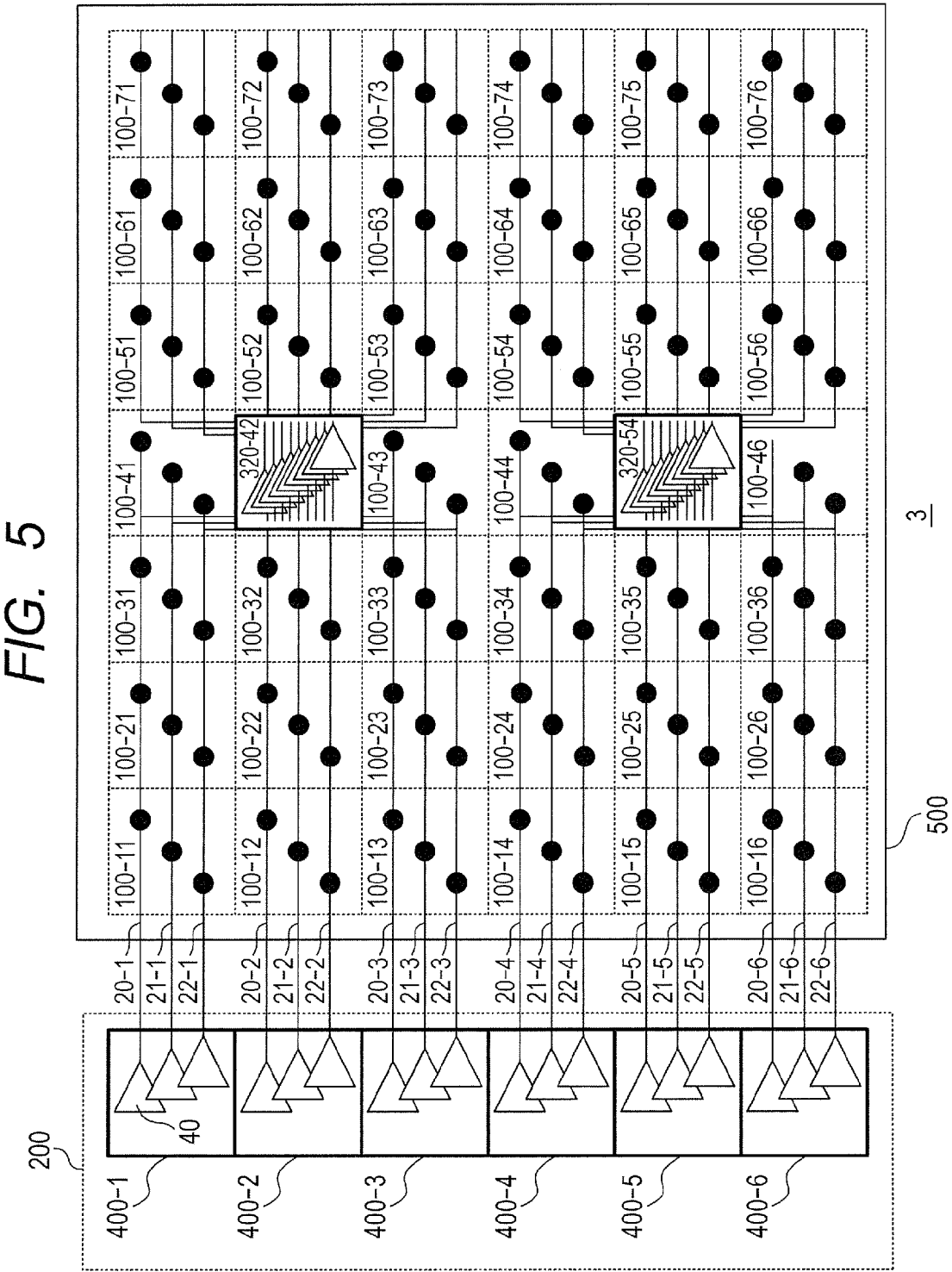
FIG. 5 is a configuration diagram of a solid-state imaging apparatus according to a third embodiment of the present invention.

FIG. 5 is a diagram illustrating an example configuration of a solid-state imaging apparatus 3 according to a third embodiment of the present invention. A buffer arranging region including buffers 30 for three rows in one region is denoted by reference numeral 320. The buffer arranging region 320-42 is arranged at row 2, column 4, and the buffer arranging region 320-54 is arranged at row 5, column 4. The buffer arranging region 320 provided in one element in the matrix includes a plurality of buffers 30 for inputting the driving signals of the pixels 100 in a prior column and in a plurality of rows, and for outputting the driving signals of the pixels 100 in a following column and in a plurality of rows. The buffer arranging regions 320 are arranged in the pixel region 500, and each include the buffer 30 for three rows, and thus, the number of the buffer arranging regions 300 may be reduced compared to the first and second embodiments. In the present embodiment, the driving signals of the driving lines 20 to 22 may reach all the pixels 100 in the large area sensor, and the number of correction marks at the time of play back of the pixel signal of the buffer arranging region 320 in image processing may be reduced compared to the first and second embodiments. Also, when arranging the buffer arranging regions 320-42 and 320-54 that are adjacent in the row direction, the buffer arranging regions 320 may be arranged in different columns.

As in the first and second embodiments, the buffer arranging region 320 may include a circuit equivalent to the pixel 100 including the photoelectric conversion element 10. Furthermore, in the case where the pixel pitch is great, being 100 μm or more, for example, and not much opening is necessary for the normal pixel 100, the area of the photoelectric conversion element 10 in the buffer arranging region 320 and the area of the photoelectric conversion element 10 of the pixel 100 may be made uniform. At this time, the same number of transistor elements as the buffer arranging regions 320 may be arranged in the pixel 100, the transistor elements having the same size as the buffer 30 in the buffer arranging region 320 and not connected to terminals.

The output circuit 40 of the vertical scanning circuit 200 and the buffer 30 in the buffer arranging region 320 are made equivalent circuits, to thereby make the driving power of the circuits uniform, and to make the pitch of the buffer arranging regions 320 starting from the vertical scanning circuit 200 the same. Or, by making the output circuit 40 and the circuit of the buffer 30 different, an optimal driving power according to the arranging interval of each circuit may be provided.

Also in the present embodiment, to reduce the influence of a pixel signal missing due to the buffer arranging region 320 at the time of viewing of the captured image as much as possible, the buffer arranging region 320 is desirably arranged such that the spatial frequency of the arranging interval of the buffer arranging regions 320 is reduced as much as possible.

As described above, the buffer arranging region 320 including buffers 30 for a plurality of rows is arranged in the pixel region 500. Accordingly, the driving signals of the driving lines 20 to 22 output from the vertical scanning circuit 200 may reach the entire screen of the large area sensor, and all the pixels 100 may be driven. Furthermore, the play back accuracy of a pixel signal missing due to the buffer arranging region 320 may be improved, and the number of correction marks may be reduced.

Fourth Embodiment

Figure 6:
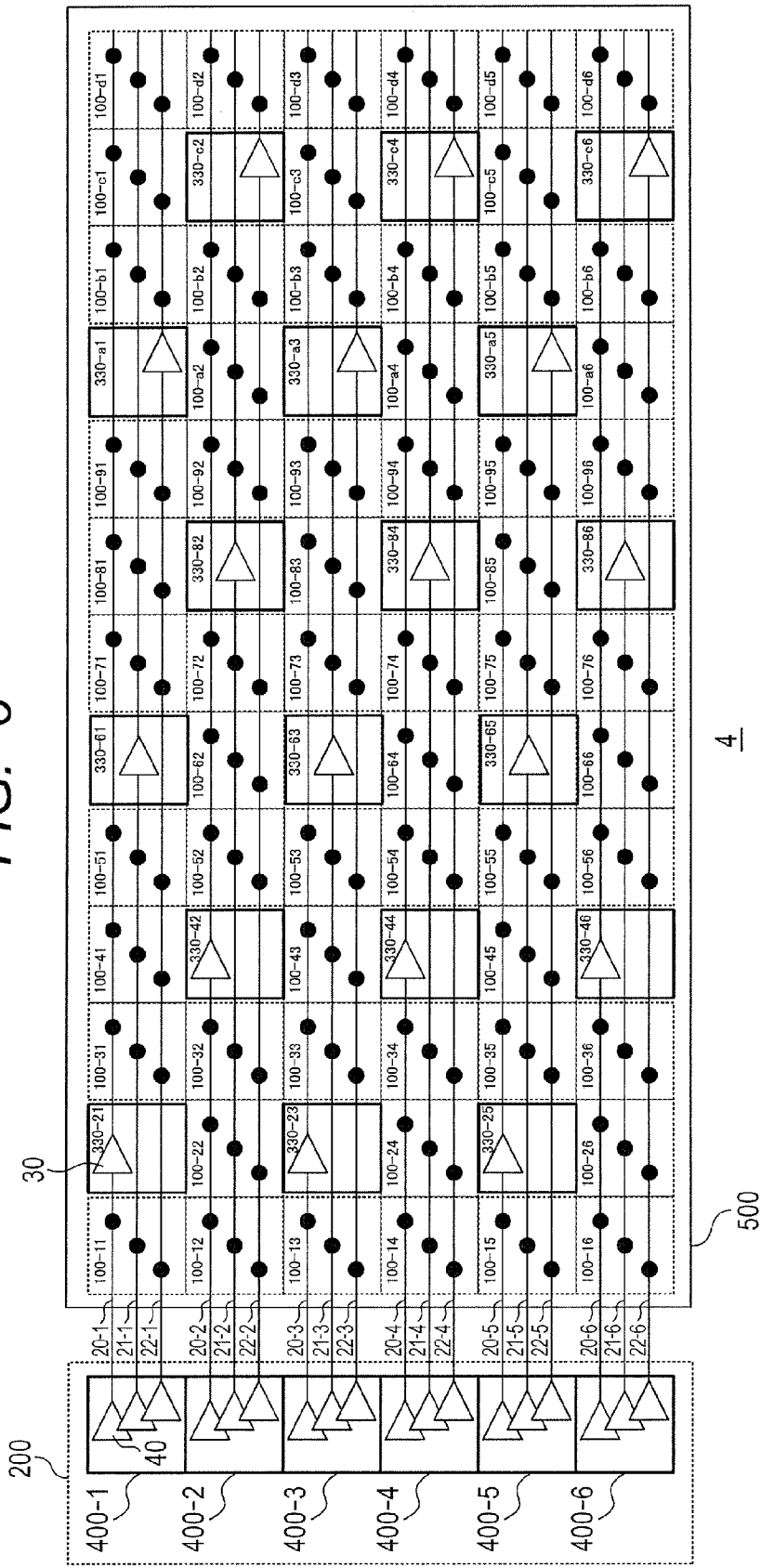
FIG. 6 is a configuration diagram of a solid-state imaging apparatus according to a fourth embodiment of the present invention.

FIG. 6 is a diagram illustrating an example configuration of a solid-state imaging apparatus 4 according to a fourth embodiment of the present invention. Buffer arranging regions 330 each include a smaller number of buffers 30 than the number of the driving lines 20 to 22 of the pixel 100 for one row. For example, the buffer arranging region 330-21 includes the buffer 30 for relaying the driving signal of the driving line 20 among the three driving lines 20 to 22 of the pixel 100. The buffer arranging region 330-61 includes the buffer 30 for relaying the driving signal of the driving line 21 among the three driving lines 20 to 22 of the pixel. The buffer arranging region 330-a1 includes the buffer 30 for relaying the driving signal of the driving line 22 among the three driving lines 20 to 22 of the pixel. The driving lines 20 to 22 supply the driving signals to the transistors 11, 14 and 15 in the pixel 100 through the buffers 30 in a plurality of buffer arranging regions 330. Some of all the pixels, i.e. the pixels 100-31 to 100-51, are arranged between one buffer arranging region 330-21 and another buffer arranging region 330-61 in the same row. In the present embodiment, each buffer arranging region 330 includes one buffer 30. By reducing the number of structural elements in one buffer arranging region 330, application to a large area sensor where the pitch of the pixels 100 is narrower is enabled.

Furthermore, as in the embodiments described above, the buffer arranging region 330 may include a circuit equivalent to the pixel 100. Also, by arranging the buffer arranging regions 330-21 and 330-42 in the adjacent rows in different columns or with more than one column in-between, the play back accuracy of the pixel signal of the buffer arranging region 330 in image processing may be improved. Furthermore, the output circuit 40 of the vertical scanning circuit 200 and the circuit of the buffer 30 are desirably such that an optical circuit configuration according to the arranging pitch of the buffer arranging regions 330 is achieved.

Also in the present embodiment, to reduce the influence of a pixel signal missing due to the buffer arranging region 330 at the time of viewing of the captured image as much as possible, the buffer arranging region 330 is desirably arranged such that the spatial frequency of the arranging interval of the buffer arranging regions 330 is reduced as much as possible.

As described above, a smaller number of buffers 30 than the driving lines 20 to 22 of the pixel 100 for one row is provided to one buffer arranging region 330. Accordingly, even with a large area sensor with a narrower pixel pitch, the driving signals of the driving lines 20 to 22 output from the vertical scanning circuit 200 may reach the entire screen, and all the pixels 100 may be driven.

Additionally, the embodiments described above merely illustrate specific examples for carrying out the present invention, and the technical scope of the present invention is not to be limited by these embodiments. That is, the present invention may be implemented in various ways within the technical idea or the main features of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-273541, filed Dec. 14, 2012, which is hereby incorporated by reference herein in its entirety.

What is claimed is:

1. A solid-state imaging apparatus, comprising:
   a pixel region including a plurality of pixels arranged therein, each pixel having a photoelectric conversion element and at least one transistor;
   a plurality of driving lines driving the plurality of transistors included in the plurality of the pixels;
   a scanning circuit arranged at an outside of the pixel region, the scanning circuit being configured to supply a driving signal to each of the plurality of driving lines; and
   a plurality of buffers, each outputting the driving signal to the driving line, wherein
   the driving lines, each supply the driving signal through the buffer to the transistors,
   each of the buffers being arranged between two pixels, and
   a number of the buffers is smaller than a number of the pixels.

2. The solid-state imaging apparatus according to claim 1, wherein each of the plurality of buffers is arranged correspondingly to each of the plurality of driving lines.

3. The solid-state imaging apparatus according to claim 1, wherein each of the pixels has the plurality of the transistors connected to the plurality of the driving lines,
   the plurality of the driving lines supply the driving signals through the plurality of the buffers in a buffer arranging region to the plurality of the transistors, and
   a number of the plurality of the buffers in a buffer arranging region equals a number of the plurality of the transistors connected to the driving lines in the pixel region.

4. The solid-state imaging apparatus according to claim 1, wherein each of the pixels has the plurality of the transistors connected to the plurality of the driving lines,
   the plurality of the driving lines supply the driving signals through the plurality of the buffers to the plurality of the transistors, and
   a part of the plurality of the pixels is arranged between one of buffer arranging regions including the buffers and another one of the buffer arranging regions including the buffers.

5. The solid-state imaging apparatus according to claim 1, wherein the pixels and buffer arranging regions including the buffers are arranged in a matrix.

6. The solid-state imaging apparatus according to claim 5, wherein the buffer arranging regions arranged in adjacent rows are arranged in columns not adjacent to each other.

7. The solid-state imaging apparatus according to claim 5, wherein the buffer arranging region arranged at one element in the matrix of the pixel arrangements includes a plurality of the buffers which input the driving signals of the pixels in a prior stage in the matrix and in a plurality of the rows, and which output the driving signals of the pixels in a following stage in the matrix and in a plurality of the rows.

8. The solid-state imaging apparatus according to claim 5, wherein each of the buffer arranging regions has an area smaller than an area of each of the pixels.

9. The solid-state imaging apparatus according to claim 8, wherein each of the buffer arranging regions has a photoelectric conversion element having an area smaller than an area of the photoelectric conversion element in each of the pixels.

10. The solid-state imaging apparatus according to claim 5, wherein each of the buffer arranging regions has a photoelectric conversion element having an area equal to an area of the photoelectric conversion element in each of the pixels.

11. The solid-state imaging apparatus according to claim 10, wherein each of the pixels has a dummy buffer of which size equal to a size of the buffer in each of the buffer arranging regions.

12. The solid-state imaging apparatus according to claim 5, wherein each of the buffer arranging regions has an area equal to or larger than an area of each of the pixels.

13. The solid-state imaging apparatus according to claim 12, wherein an area of the photoelectric conversion element adjacent to each of the buffer arranging regions is smaller than an area of the photoelectric conversion element not adjacent to the buffer arranging region.

14. The solid-state imaging apparatus according to claim 1, wherein the scanning circuit further comprises an output circuit configured to output the driving signal to the driving line in the pixel region, and
each of the buffers has a same driving power as that of the output circuit.

15. The solid-state imaging apparatus according to claim 1, wherein the scanning circuit further comprises an output circuit configured to output the driving signal to the driving line in the pixel region, and
each of the buffers has a driving power that is different from that of the output circuit.

16. A solid-state imaging apparatus, comprising:
a pixel region including a plurality of pixels arranged therein, each pixel having a photoelectric conversion element and at least one transistor;
a plurality of driving lines, each driving the plurality of transistors included in the plurality of pixels;
a scanning circuit arranged at an outside of the pixel region, the scanning circuit being configured to supply a driving signal to each of the plurality of driving lines; and
a plurality of buffers, each outputting the driving signal to the driving line, wherein
each of the buffers is arranged between two of the pixels,
one of the transistors is arranged at an input node of the buffer and another one of the transistors is arranged at an output node of the buffer, and
a number of the buffers is smaller than a number of the pixels.

17. The solid-state imaging apparatus according to claim 16, wherein the pixels and buffer arranging regions including the buffers are arranged in a matrix.

18. The solid-state imaging apparatus according to claim 17, wherein the buffer arranging regions arranged in adjacent rows are arranged in columns not adjacent to each other.

19. The solid-state imaging apparatus according to claim 17, wherein the buffer arranging region arranged at one element in the matrix of the pixel arrangements includes a plurality of the buffers which input the driving signals of the pixels in a prior stage in the matrix and in a plurality of the rows, and which output the driving signals of the pixels in a following stage in the matrix and in a plurality of the rows.

20. A solid-state imaging apparatus, comprising:
a plurality of pixels that are arranged along a first direction, each of the plurality of pixels having a photoelectric conversion element and at least one transistor;
a driving line that is extended to the first direction and is connected to the transistors included in the plurality of pixels;
a scanning circuit that outputs to the driving line a driving signal for driving the transistors included in the plurality of pixels; and
a buffer circuit that buffers the driving signal, wherein the buffer circuit is arranged between the photoelectric conversion element included in one of the plurality of pixels and the photoelectric conversion element included in another one of the plurality of pixels.

* * * * *